United States Patent
Merkel et al.

[15] 3,657,004
[45] Apr. 18, 1972

[54] METHOD FOR PRODUCING HIGHLY PURE GALLIUM ARSENIDE

[72] Inventors: Hans Merkel, Erlangen; Siegfried Leibenzeder, Erlangen-Buchenbach, both of Germany

[73] Assignee: Siemens Aktiengesellschaft, Berlin and Munich, Germany

[22] Filed: Jan. 8, 1970

[21] Appl. No.: 1,399

[30] Foreign Application Priority Data

Jan. 11, 1969 Germany ............... P 19 01 319.5

[52] U.S. Cl. .................. 117/201, 117/106 A, 148/174, 148/175
[51] Int. Cl. .............. C23c 11/00, C23c 13/00, H01l 7/36
[58] Field of Search ............. 117/201, 106 A; 148/174, 175

[56] References Cited

UNITED STATES PATENTS

| | | | |
|---|---|---|---|
| 3,397,094 | 8/1968 | Webb | 148/174 |
| 3,290,181 | 12/1966 | Sirtl | 117/106 A X |
| 3,197,411 | 7/1965 | Frosch | 117/106 A X |
| 3,341,367 | 9/1967 | Beyerlein | 117/201 X |
| 3,178,313 | 4/1965 | Moest | 117/201 |

*Primary Examiner*—Alfred L. Leavitt
*Assistant Examiner*—Kenneth P. Glynn
*Attorney*—Curt M. Avery, Arthur E. Wilfond, Herbert L. Lerner and Daniel J. Tick

[57] ABSTRACT

Method of depositing gallium arsenide upon substrate wafers in a closed reaction system using water as the transport medium. The water together with $B_2O_3$ is placed in a reaction vessel along with gallium arsenide and the wafers to be coated. The ratio of boron oxide to water is $1:10^{-5}$.

5 Claims, 1 Drawing Figure

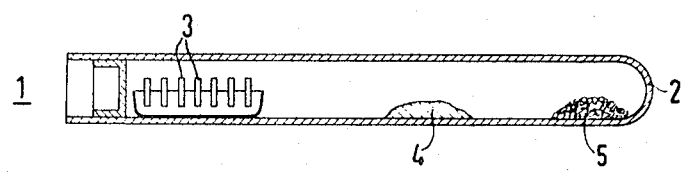

METHOD FOR PRODUCING HIGHLY PURE GALLIUM ARSENIDE

Modern electronic processes always require pure gallium arsenide. The latter is obtained through a chemical transport via the gaseous phase and by epitactic precipitation upon a substrate, since the danger of contamination by the container material is negligible due to the low precipitation temperature.

According to Schafer in "Chemical Transportreaction" published in Chemie, 1962, chemical transports are characterized by the fact that a solid or liquid substance "A" reacts with gases to form only gaseous reaction products and subsequently reverse reactions take place at other locations of the system, accompanied by precipitation of "A." Another important characteristic is a correctly chosen temperature gradient. In the semi-conductor art, this method is effected with the aid of various gases. The gases functioning thereby are usually halogens, preferable iodine or halogen compounds, which react with substance "A," by forming gaseous subcompounds. These transport reactions can be carried out in an open or a closed system. The open system is recommended for its simplicity of the testing device, however considerable shortcomings must be accepted in exchange. The greatest danger lies in the introduction of impurities and the loss of valuable chemicals. The open system must constantly be rinsed by a so called carrier gas. Therefore, the introduction of impurities cannot be avoided. The carrier gas brings the transport medium into the reaction zone. Only a very slight portion of said transport medium reacts therein. The excess is lost in the exhaust gas. In this method of operation, a loss of valuable chemicals is inevitable, making the method more expensive since only highly purified chemicals can be employed. Moreover additional sources of contamination are produced by the high gas throughputs.

By contrast, the closed system entails less impurity possibilities, since the above-described disadvantages, such as large amounts of carrier gas, large amounts of transport mediums and great loss do not occur in the closed system. A transport gas is not required and a negligible amount of the selected transport medium is adequate for the formation of the gaseous intermediate product.

When halogen or halogen containing transport mediums are used in an open or closed system the same are installed in various amounts, contrary to water, into the lattice of the precipitated material, depending on the reaction conditions. Up to now, water could be employed only in an open system since in a closed system the dosing of said transport medium entailed great difficulties.

We have now found that water is suitable for a chemical transport of gallium arsenide if it is introduced into the transport system with the aid of the donor substance, boron trioxide. The water is homogeneously distributed with the aid of said donor substance. It is particularly advantageous to use boron trioxide water mixtures with a content of about 55 to almost 100 Mole percent boron trioxide.

The present invention preferably operates with a free gas volume between 0.1 and 0.2 liter for a transport reaction in a closed system whereby boron trioxide is used as a donor. Very little water is needed for the transport. A boron trioxide/water mixture with 55 to almost 100 Mole percent boron trioxide, particularly a ratio of boron trioxide to water of $1:10^{-5}$ was found particularly favorable. A steam pressure of 2 to 3 Torr is particularly preferred. The moistening of the donor substance boron trioxide, which is necessary for precision dosing is effected by utilizing the steam pressure depending on the temperature, hence by adjusting an exactly defined humidity, with conventional drying means.

The chemical transport mechanism which takes place in the method of the present invention is expressed by the Equation:
$$2\ GaAs_{(l)} + H_2O_{(g)} \overset{<700°\,C/775°\,C}{\longrightarrow} Ga_2O_{(g)} + 2/x\ As_{x(g)} + H_2$$

According to the method of the present invention, transport reactions can be executed in a closed system with water or steam serving as the transport medium and by using boron trioxide as a donor substance.

The method is particularly simple. The yield is good. The transported substance is purer since the disadvantages of working in an open system which entail for example the contamination through the carrier gas, or the installation of halogens or halogen containing compounds into the crystal lattice, when said substances are used as transport mediums, is eliminated. Moreover, the use of very valuable, purest chemical substances is considerably lessened.

The fine dosing of water is easy according to the new method and is easily carried out. First, the donor substance boron trioxide is loaded with water, which constitutes the transport means. To this end, dehydrated, and extremely dry boron trioxide is pulverized, whereby the moisture content in the pulverization vessel is smaller than over the drying medium during the subsequent, planned moisturing of the boron trioxide with water. The pulverized boron trioxide is contacted with an exactly defined humidity, until a homogeneous boron trioxide/water mixture develops that corresponds to the water vapor pressure and equilibrium is obtained. The amount of water absorbed by the donor substance is extremely small and homogeneously distributed. According to the invention, gallium arsenide grows with the boron trioxide/water, in an evacuated closed transport system, at variable conditions, upon the substrate crystals.

The highly pure gallium arsenide obtained finds use in electronic components, e.g. for luminescence diodes, Gunn diodes, injection lasers, bipolar transistors and Schottky barrier diodes.

The invention will be described in greater detail with reference to the drawing which shows suitable apparatus for carrying out the method.

EXAMPLE

About 12 g pulverized, highly pure, conventional $B_2O_3$ with a water content of 10 to 15 percent by weight were heated in a platinum crucible in a high vacuum at $10^{-5}$ to $10^{-6}$ Torr, up to 1,200° C, in order to effect complete dehydration and pulverized in a glove box, whose air content had previously been dried with $P_2O_5$. The moisture content across the drying medium in the box during the pulverization of the extremely dry $B_2O_3$ is smaller than the one across the drying medium during the ensuing, planned moisturization of the $B_2O_3$, with water.

The dehydrated and pulverized $B_2O_3$ was then placed into a desiccator, over 20 percent sulphuric acid, across which a vapor pressure of 15.4 Torr is known to develop, at 20° C. $1.2 \cdot 10^{-4}$ g homogeneously distributed water was absorbed by approximately 12 g boron trioxide. This amount could never be introduced into the reaction vessel if other methods were employed.

The thus produced water/boron trioxide was introduced in the transport system 1, shown in the FIGURE into a quartz tube 2, at location 5, said quartz tube being sealed on one side. Also shown is the gallium arsenide source 4 and the substrate wafers 3. The entire system was evacuated at $10^{-6}$ and sealed (fused) in a high vacuum.

The substrate discs to be coated are then heated for 30 minutes to a temperature of 800° C, to remove the surface impurities. The region of the substrate wafers was adjusted to a temperature of 700° C while the temperature of the gallium arsenide source was maintained at approximately 775° C. For the ensuing transport the region of the water/boron trioxide was heated to about 725° C. Under these conditions, 2 mg of gallium arsenide of high purity were precipitated within 12 hours, upon the substrate crystals, which corresponds to a growth rate of approximately 0.2 micron thickness per wafer. Due to the chosen reaction conditions, i.e. very small growth rates, we obtained growth layer with the greatest possible crystal perfection.

We claim:

1. In the method of producing highly pure gallium arsenide through a chemical transport reaction, in a closed system, the improvement which comprises introducing water as the transport medium into the transport system, with the aid of the donor substance boron trioxide and carrying out the transport reaction at a temperature of 700° to 775° C.

2. The method of claim 1, wherein the water is homogeneously installed into the transport system, with the aid of the donor substance boron trioxide.

3. The method of claim 1, wherein a boron trioxide/water mixture containing from approximately 55 to almost 100 Mole percent boron trioxide is employed.

4. The method of claim 1, wherein the transport reaction is conducted at a steam pressure of 2 to 3 Torr, which corresponds to a boron trioxide/water weight ration of $1:10^{-5}$.

5. The method of producing highly pure gallium arsenide upon a substrate in a closed transport system, which comprises placing boron trioxide/water, gallium arsenide and the substrate in a closed reaction system, and heating the substrate to 700° C, the gallium arsenide to 775° C and the boron trioxide/water to 725° C, the weight ratio of boron trioxide:water being $1:10^{-5}$.

* * * * *